(12) United States Patent
Li

(10) Patent No.: US 11,968,447 B2
(45) Date of Patent: Apr. 23, 2024

(54) LONG-FOCUS SHOOTING METHOD AND ELECTRONIC DEVICE

(71) Applicant: Huawei Technologies Co., Ltd., Shenzhen (CN)

(72) Inventor: Renpeng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/794,831

(22) PCT Filed: Nov. 16, 2020

(86) PCT No.: PCT/CN2020/128986
§ 371 (c)(1),
(2) Date: Jul. 22, 2022

(87) PCT Pub. No.: WO2021/147482
PCT Pub. Date: Jul. 29, 2021

(65) Prior Publication Data
US 2023/0081664 A1 Mar. 16, 2023

(30) Foreign Application Priority Data
Jan. 23, 2020 (CN) .......................... 202010077034.6

(51) Int. Cl.
*H04N 23/67* (2023.01)
*H04N 23/63* (2023.01)
*H04N 23/69* (2023.01)

(52) U.S. Cl.
CPC ......... *H04N 23/675* (2023.01); *H04N 23/632* (2023.01); *H04N 23/69* (2023.01)

(58) Field of Classification Search
CPC .... H04N 23/632; H04N 23/675; H04N 23/69; H04N 23/63
(Continued)

(56) References Cited

U.S. PATENT DOCUMENTS 5,754,230 A 5/1998 Tsuruta
7,447,425 B2 * 11/2008 Gong .................. H04N 5/2628
396/374
(Continued)

FOREIGN PATENT DOCUMENTS

CN 101115148 A 1/2008
CN 101794203 A 8/2010
(Continued)

OTHER PUBLICATIONS

Wang Fuyue et al., Realization of a Real-time Chip Image Acquisition and Processing System, Aug. 15, 2004, with the English Abstract, 5 pages.

*Primary Examiner* — Pritham D Prabhakher
(74) *Attorney, Agent, or Firm* — Conley Rose, P.C.

(57) ABSTRACT

This application provides a long-focus shooting method and an electronic device. The method may be performed by an electronic device such as a tablet or a watch that has a digital zoom capability and a long-focus shooting capability. In a long-focus shooting process, in this method, two framed pictures are simultaneously displayed, an original framed picture at "5×" is displayed in an auxiliary viewfinder window, and a framed picture obtained after a user adjusts a magnification to "50×" is displayed in an image preview display area, to provide the user with two preview pictures with different fields of view. In the long-focus shooting process, based on the original framed picture at "5×" displayed in the auxiliary viewfinder window, the user finds a subject of a shooting target more easily. This improves long-focus shooting experience.

17 Claims, 12 Drawing Sheets

(58) Field of Classification Search
USPC .................................................. 348/333.08
See application file for complete search history.

(56) References Cited

U.S. PATENT DOCUMENTS

| | | | | |
|---|---|---|---|---|
| 7,924,340 | B2* | 4/2011 | Kato | H04N 23/611 |
| | | | | 348/333.03 |
| 8,154,646 | B2* | 4/2012 | Yanagi | H04N 23/63 |
| | | | | 348/333.12 |
| 8,363,126 | B2 | 1/2013 | Kurokawa | |
| 8,553,099 | B2* | 10/2013 | Tsuchiya | H04N 23/661 |
| | | | | 348/333.05 |
| 8,823,857 | B2* | 9/2014 | Kazama | H04N 23/69 |
| | | | | 348/333.05 |
| 8,917,335 | B2* | 12/2014 | Yanagi | H04N 23/63 |
| | | | | 348/240.99 |
| 9,215,375 | B2* | 12/2015 | Shintani | H04N 23/61 |
| 10,158,805 | B2* | 12/2018 | Hwang | H04N 1/00456 |
| 10,291,842 | B2* | 5/2019 | Kim | G06T 7/292 |
| 10,356,300 | B2 | 7/2019 | Lee et al. | |
| 10,432,876 | B2* | 10/2019 | Hirooka | H04N 23/69 |
| 10,469,726 | B1 | 11/2019 | Tsai | |
| 10,516,829 | B2 | 12/2019 | Shin et al. | |
| 10,571,929 | B2* | 2/2020 | Hur | H04N 23/62 |
| 10,805,822 | B2* | 10/2020 | Kim | H04W 24/10 |
| 2007/0146528 | A1* | 6/2007 | Yanagi | H04N 23/635 |
| | | | | 348/E5.045 |
| 2007/0291154 | A1* | 12/2007 | Moon | H04N 23/6845 |
| | | | | 348/333.05 |
| 2008/0024643 | A1 | 1/2008 | Kato | |
| 2009/0009652 | A1 | 1/2009 | Sudo et al. | |
| 2009/0290046 | A1* | 11/2009 | Kita | H04N 23/667 |
| | | | | 348/347 |
| 2009/0303354 | A1* | 12/2009 | Yanagi | H04N 1/2125 |
| | | | | 348/240.1 |
| 2010/0173678 | A1 | 7/2010 | Kim et al. | |
| 2010/0245630 | A1 | 9/2010 | Kurokawa | |
| 2011/0043663 | A1 | 2/2011 | Tsuchiya | |
| 2012/0154635 | A1* | 6/2012 | Yanagi | G03B 17/04 |
| | | | | 348/E5.024 |
| 2012/0268641 | A1* | 10/2012 | Kazama | H04N 23/45 |
| | | | | 348/E5.051 |
| 2013/0120642 | A1 | 5/2013 | Kim | |
| 2013/0155308 | A1* | 6/2013 | Wu | H04N 23/611 |
| | | | | 348/333.05 |
| 2013/0314580 | A1 | 11/2013 | Ju et al. | |
| 2014/0267803 | A1 | 9/2014 | Shintani et al. | |
| 2016/0165133 | A1* | 6/2016 | Son | G06F 3/017 |
| | | | | 348/207.11 |
| 2016/0381289 | A1 | 12/2016 | Kim et al. | |
| 2017/0150066 | A1 | 5/2017 | Hirooka et al. | |
| 2018/0129224 | A1* | 5/2018 | Hur | G06F 3/0412 |
| 2018/0183982 | A1* | 6/2018 | Lee | H04N 23/698 |
| 2021/0168300 | A1 | 6/2021 | Wang et al. | |
| 2022/0321795 | A1 | 10/2022 | Jiang | |

FOREIGN PATENT DOCUMENTS

| | | |
|---|---|---|
| CN | 102821238 A | 12/2012 |
| CN | 104333689 A | 2/2015 |
| CN | 104333701 A | 2/2015 |
| CN | 104679394 A | 6/2015 |
| CN | 106909274 A | 6/2017 |
| CN | 108429881 A | 8/2018 |
| CN | 109194839 A | 1/2019 |
| CN | 110401766 A | 11/2019 |
| CN | 110445978 A | 11/2019 |
| CN | 111212235 A | 5/2020 |
| JP | 2008028959 A | 2/2008 |
| JP | 2010232962 A | 10/2010 |
| JP | 2011044863 A | 3/2011 |
| JP | 2014179940 A | 9/2014 |
| JP | 2017175589 A | 9/2017 |
| KR | 20100093955 A | 8/2010 |
| WO | 2017200049 A1 | 11/2017 |
| WO | 2018166069 A1 | 9/2018 |

* cited by examiner

LONG-FOCUS SHOOTING METHOD AND ELECTRONIC DEVICE

CROSS-REFERENCE TO RELATED APPLICATIONS

This is a U.S. National Stage of International Patent Application No. PCT/CN2020/128986, filed on Nov. 16, 2020, which claims priority to Chinese Patent Application No. 202010077034.6, filed on Jan. 23, 2020.

Both of the aforementioned applications are hereby incorporated by reference in their entireties.

TECHNICAL FIELD

This application relates to the field of electronic technologies, and in particular, to a long-focus shooting method and an electronic device.

BACKGROUND

With continuous development of terminal technologies, a shooting function has become an important feature of a terminal device and a main indicator for evaluating performance of the terminal device. When a user performs shooting by using a portable terminal device such as a mobile phone, the user has an ultra-long-focus shooting requirement. In an ultra-long-focus shooting process of the terminal device, by using an installed long-focus prime lens, a shot picture of the long-focus prime lens is cropped around a center point, and image quality is optimized, to implement long-focus framing with a larger magnification.

For example, in a process of obtaining a 50× magnified framed picture through ultra-long-focus shooting of a mobile phone, a 5× magnified framed picture shot by a long-focus prime lens of the mobile phone is cropped, and the 50× magnified framed picture is obtained through a digital zoom process. Because an axis of a lens of the mobile phone is fixed and cannot be rotated, in a shooting process, to find a subject of a shooting target, a user needs to align the mobile phone with the shooting target. However, an area of the 50× magnified framed picture is only 1/100 of an area of a framed picture of a 5× lens, a framing range is equivalent to that of a single-lens reflex lens with a 1340 mm focal length, a field of view (field of view, FOV) is only about 0.5 degrees, and a coverage area of the framed picture is very small. Therefore, ultra-long-focus shooting magnifies jitter and causes the framed picture to deviate. In addition, when the framed picture deviates considerably, it is difficult to find the shooting target.

SUMMARY

This application provides a long-focus shooting method and an electronic device. In the method, two framed pictures are simultaneously displayed, so that in a long-focus shooting process, a user can more easily find a subject of a shooting target, to improve shooting experience.

According to a first aspect, a long-focus shooting method is provided and is performed by an electronic device including a lens. The method includes: displaying a shooting interface of a camera of the electronic device, where the shooting interface includes an image preview area, and the image preview area displays a first preview picture; and detecting a first operation, and simultaneously displaying, by the electronic device, the image preview area and an auxiliary preview window on the shooting interface in response to the first operation, where the auxiliary preview window displays a second preview picture. The first preview picture and the second preview picture are obtained by using the lens, the first preview picture is a framed picture at a first magnification, the second preview picture is a framed picture at a second magnification, the first preview picture is obtained by cropping the second preview picture, and the first magnification is greater than or equal to the second magnification.

According to the foregoing solution, based on a current shooting requirement of a user, for example, in a long-focus shooting process, in this method, two framed pictures are simultaneously displayed, an original framed picture at "5×" is displayed in the auxiliary viewfinder window, and a framed picture obtained after the user adjusts a magnification to "50×" is displayed in the image preview display area, to provide the user with two preview pictures with different fields of view. In the long-focus shooting process, based on the original framed picture at "5×" displayed in the auxiliary viewfinder window, the user finds a subject of a shooting target more easily without changing a shooting angle of a mobile phone or the lens. This improves long-focus shooting experience.

With reference to the first aspect, in some implementations of the first aspect, the image preview area and the auxiliary preview window are displayed in any one of the following manners: at least a part of the auxiliary preview window overlaps the image preview area; or the auxiliary preview window is displayed in a position outside the image preview area; or the auxiliary preview window is located in a lower left corner of the image preview area.

According to the foregoing method, the auxiliary preview window may be displayed in different manners on an interface of the camera application, to adapt to different shooting scenarios and improve shooting experience of a user. For example, the auxiliary preview window and the image preview area do not overlap, so that the user can view a larger preview picture, to improve shooting experience.

With reference to the first aspect and the foregoing implementations, in some implementations of the first aspect, the first operation is an adjustment operation of a user on a magnification in a magnification adjustment area, and the displaying, by the electronic device, an auxiliary preview window on the shooting interface in response to the first operation includes: When detecting that the first magnification is greater than or equal to a first threshold, the electronic device automatically displays the auxiliary preview window on the shooting interface.

Optionally, the user may slide on a magnification in a magnification adjustment area 30 of a mobile phone. When the magnification reaches the first threshold (for example, "5×"), the mobile phone automatically switches a lens to be in a long-focus shooting mode, and obtains an original framed picture by using a long-focus lens of the mobile phone. Alternatively, the lens may enter the long-focus shooting mode in another manner such as user setting. This is not limited in this embodiment of this application.

With reference to the first aspect and the foregoing implementations, in some implementations of the first aspect, the first operation is an operation of the user to open the auxiliary preview window in the camera application.

For example, the camera application may include a switch for enabling a long-focus shooting function, that is, an auxiliary framed picture switch. For example, the auxiliary framed picture switch is set in a top menu area, the user directly taps the auxiliary framed picture switch in the top menu area, to enable the long-focus shooting function, and an auxiliary viewfinder frame is displayed. Alternatively, the auxiliary framed picture switch is included in a setting menu, the user may enable the long-focus shooting function by using the setting menu, and the auxiliary viewfinder frame is displayed.

With reference to the first aspect and the foregoing implementations, in some implementations of the first aspect, the auxiliary preview window further includes a close button, and after the electronic device displays the auxiliary preview window on the shooting interface, the method further includes: The electronic device closes the auxiliary preview window if the electronic device detects an operation of the user on the close button.

For example, when the user completes focusing, and the subject of the shooting target is displayed in the image preview area, the user may close the auxiliary viewfinder frame, so that there may be a larger image preview area, and it is convenient for the user to view an image preview picture.

With reference to the first aspect and the foregoing implementations, in some implementations of the first aspect, the auxiliary preview window further includes a target area, an image of the first preview picture is obtained by processing an image in the target area, and the target area is a fixed area in the auxiliary preview window, or the target area is any area in the auxiliary preview window.

With reference to the first aspect and the foregoing implementations, in some implementations of the first aspect, the method further includes: detecting a drag operation on the auxiliary preview window, and moving the auxiliary preview window from a first position to a second position in response to the drag operation.

According to the foregoing method, the user may move the auxiliary viewfinder frame based on an image currently displayed in the image preview area, to minimize covering of the auxiliary viewfinder frame on the image displayed in the image preview display area.

According to a second aspect, an electronic device is provided, including: a lens, configured to obtain a to-be-shot picture; one or more processors; a memory; a plurality of applications; and one or more programs, where the one or more programs are stored in the memory, and when the one or more programs are executed by the processor, the electronic device is enabled to perform the following steps: displaying a shooting interface of a camera, where the shooting interface includes an image preview area, and the image preview area displays a first preview picture; and detecting a first operation, and simultaneously displaying the image preview area and an auxiliary preview window on the shooting interface in response to the first operation, where the auxiliary preview window displays a second preview picture. The first preview picture and the second preview picture are obtained by using the lens, the first preview picture is a framed picture at a first magnification, the second preview picture is a framed picture at a second magnification, the first preview picture is obtained by cropping the second preview picture, and the first magnification is greater than or equal to the second magnification.

With reference to the second aspect, in some implementations of the second aspect, the image preview area and the auxiliary preview window are displayed in any one of the following manners: at least a part of the auxiliary preview window overlaps the image preview area; or the auxiliary preview window is displayed in a position outside the image preview area; or the auxiliary preview window is located in a lower left corner of the image preview area.

With reference to the second aspect and the foregoing implementations, in some implementations of the second aspect, the first operation is an adjustment operation of a user on a magnification in a magnification adjustment area, and when the one or more programs are executed by the processor, the electronic device is enabled to perform the following step: when detecting that the first magnification is greater than or equal to a first threshold, automatically displaying the auxiliary preview window on the shooting interface.

With reference to the second aspect and the foregoing implementations, in some implementations of the second aspect, the first operation is an operation of the user to open the auxiliary preview window in the camera application.

With reference to the second aspect and the foregoing implementations, in some implementations of the second aspect, the auxiliary preview window further includes a close button, and when the one or more programs are executed by the processor, the electronic device is enabled to perform the following step: closing the auxiliary preview window if an operation of the user on the close button is detected.

With reference to the second aspect and the foregoing implementations, in some implementations of the second aspect, the auxiliary preview window further includes a target area, an image of the first preview picture is obtained by processing an image in the target area, and the target area is a fixed area in the auxiliary preview window, or the target area is any area in the auxiliary preview window.

With reference to the second aspect and the foregoing implementations, in some implementations of the second aspect, when the one or more programs are executed by the processor, the electronic device is enabled to perform the following steps: detecting a drag operation on the auxiliary preview window, and moving the auxiliary preview window from a first position to a second position in response to the drag operation.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by using hardware, or may be implemented by using hardware executing corresponding software. The hardware or the software includes one or more modules or units corresponding to the foregoing function, for example, a display module or unit, a detection module or unit, or a processing module or unit.

According to a fourth aspect, this application provides an electronic device, including a touchscreen. The touchscreen includes a touch-sensitive surface, a display, a camera, one or more processors, a memory, a plurality of applications, and one or more computer programs. The one or more computer programs are stored in the memory. The one or more computer programs include instructions. When the instructions are executed by the electronic device, the electronic device is enabled to perform the long-focus shooting method according to any possible implementation of any one of the foregoing aspects.

According to a fifth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the long-focus shooting method according to any possible implementation of any one of the foregoing aspects.

According to a sixth aspect, this application provides a computer-readable storage medium, including computer instructions. When the computer instructions are run on an electronic device, the electronic device is enabled to perform the long-focus shooting method according to any possible implementation of any one of the foregoing aspects.

According to a seventh aspect, this application provides a computer program product. When the computer program product is run on an electronic device, the electronic device is enabled to perform the long-focus shooting method according to any possible implementation of any one of the foregoing aspects.

DESCRIPTION OF EMBODIMENTS

The following describes technical solutions in embodiments of this application with reference to the accompanying drawings in embodiments of this application. In the descriptions of embodiments of this application, "I" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for description, and shall not be understood as an indication or implication of relative importance or implicit indication of a quantity of indicated technical features. Therefore, a feature limited to "first" and "second" may explicitly or implicitly include one or more of the features, for example, a "first preview stream" and a "second preview stream" described in embodiments of this application.

A long-focus shooting method provided in embodiments of this application may be performed by any electronic device that can implement a shooting function, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

It should be understood that a lens, for example, a long-focus lens, is installed in the electronic device. The lens may be a long-focus prime lens, or may a long-focus zoom lens that may appear in the future. A form of the lens is not limited in this application.

Figure 1:
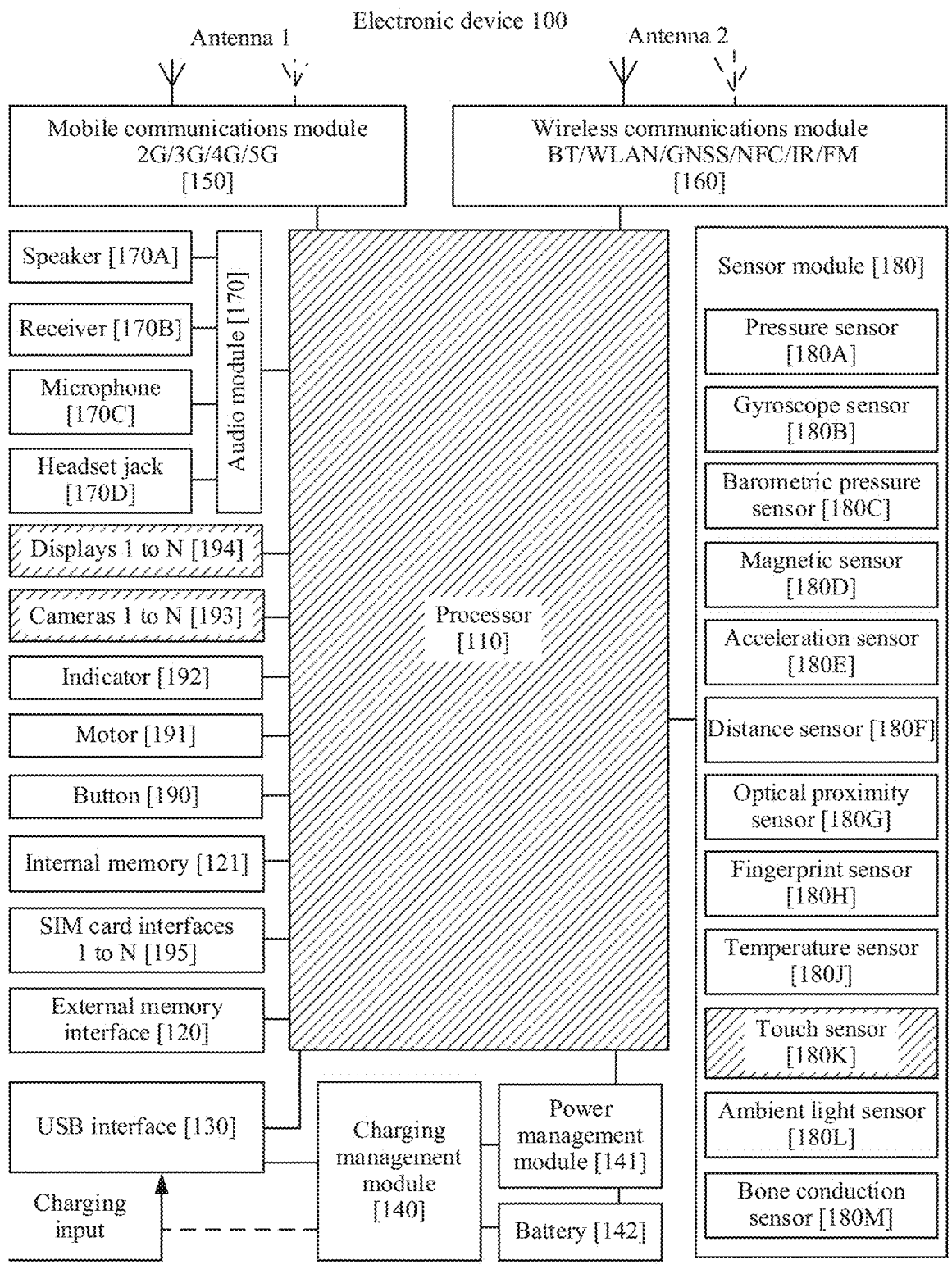
FIG. 1 is a schematic diagram of a structure of an electronic device according to an embodiment of this application.

For example, FIG. 1 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to control instruction reading and instruction execution.

The memory may be further disposed in the processor 110, and is configured to store instructions and data. In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus. The processor 110 may be coupled to the touch sensor 180K through the I2C interface, so that the processor 110 communicates with the touch sensor 180K through the I2C bus interface, to implement a touch function of the electronic device 100. The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display 194 through the DSI, to implement a display function of the electronic device 100.

It may be understood that an interface connection relationship between modules illustrated in embodiments of this application is merely an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from the charger. The charger may be a wireless charger or a wired charger. The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 can implement a shooting function by using the ISP, the camera 193, the touch sensor, the video codec, the GPU, the display 194, the application processor, and the like. For example, a long-focus shooting process is described in embodiments of this application.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. It should be understood that in descriptions of embodiments of this application, an image in an RGB format is used as an example for description, and an image format is not limited in embodiments of this application. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The external memory interface 120 may be configured to connect to an external memory card, for example, a micro SD card, to extend a storage capability of the electronic device 100. The internal memory 121 may be configured to store computer-executable program code, and the executable program code includes instructions. The processor 110 runs the instructions stored in the internal memory 121, to perform various function applications of the electronic device 100 and data processing. The internal memory 121 may include a program storage area and a data storage area.

The electronic device 100 may implement an audio function such as music playing and recording by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. The gyroscope sensor 180B may be configured to determine a motion posture of the electronic device 100. The barometric pressure sensor 180C is configured to measure barometric pressure. The magnetic sensor 180D includes a Hall effect sensor. The electronic device 100 may detect opening and closing of a flip cover by using the magnetic sensor 180D. The acceleration sensor 180E may detect accelerations in various directions (usually on three axes) of the electronic device 100. The distance sensor 180F is configured to measure a distance. The electronic device 100 may measure the distance in an infrared or a laser manner. In some embodiments, in a shooting scenario, the electronic device 100 may measure a distance by using the distance sensor 180F, to implement quick focusing. The optical proximity sensor 180G may include, for example, a light-emitting diode (LED) and an optical detector such as a photodiode. The ambient light sensor 180L is configured to sense ambient light brightness. The electronic device 100 may adaptively adjust brightness of the display 194 based on the sensed ambient light brightness. The ambient light sensor 180L may be further configured to automatically adjust a white balance during shooting. The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like. The temperature sensor 180J is configured to detect a temperature. The touch sensor 180K is also referred to as a "touch panel". The touch sensor 180K may be disposed on the display 194. The touch sensor 180K and the display 194 constitute a touchscreen. The touch sensor 180K is configured to detect a touch operation performed on or near the touch sensor 180K. The bone conduction sensor 180M may obtain a vibration signal. The audio module 170 may obtain a voice signal through parsing based on the vibration signal that is of the vibration bone of the vocal part and that is obtained by the bone conduction sensor 180M, to implement a voice function.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. For touch operations performed on different areas of the display 194, the motor 191 may also correspond to different vibration feedback effects. The indicator 192 may be an indicator, and may be configured to indicate a charging status and a power change, or may be configured to indicate a message, a missed call, a notification, and the like. The SIM card interface 195 is configured to connect to a SIM card.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
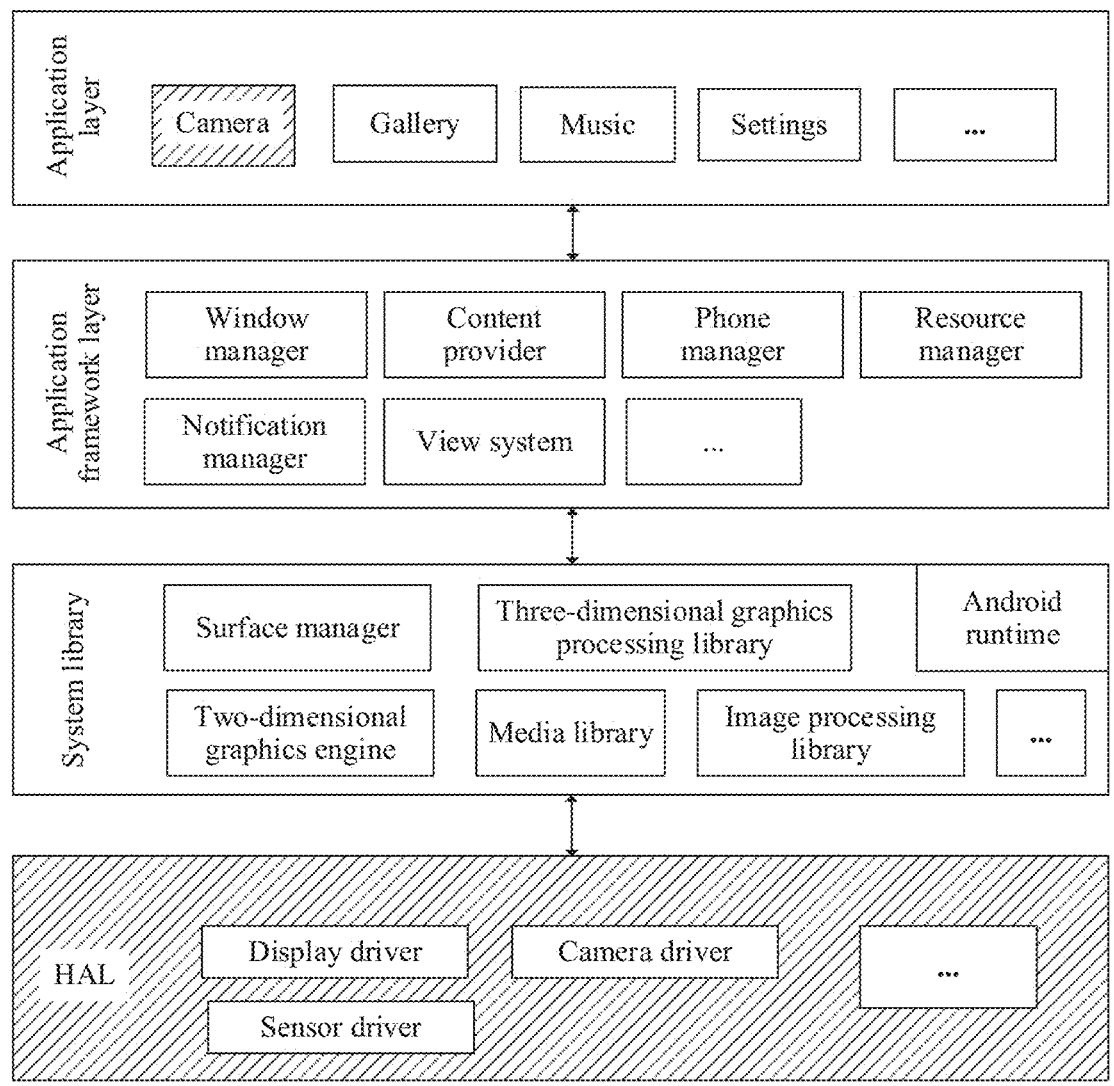
FIG. 2 is a block diagram of a software structure of an electronic device 100 according to an embodiment of this application.

FIG. 2 is a block diagram of the software structure of the electronic device 100 according to an embodiment of this application. In the layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a hardware abstract layer (hardware abstract layer, HAL) from top to bottom.

The application layer may include a series of application packages. As shown in FIG. 2, the application packages may include applications such as Camera, Gallery, Music, and Settings.

The application framework layer provides an application programming interface (application programming interface, API) and a programming framework for an application at the application layer. The application framework layer includes some predefined functions. As shown in FIG. 2, the application program framework layer may include a window manager, a content provider, a view system, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, an address book, and the like.

The view system includes visual controls, such as a control for displaying a text and a control for displaying a picture. The view system can be configured to construct an application. A display interface may include one or more views. For example, a display interface including a notification icon of Messages may include a text display view and a picture display view.

The resource manager provides various resources for an application, such as a localized character string, an icon, a picture, a layout file, and a video file.

The notification manager enables an application to display notification information in a status bar, and may be configured to convey a notification type message of a. The notification information displayed in the status bar may automatically disappear after staying for a short pause, for example, a message reminder used to notify a user that the download is completed. The notification manager may alternatively be a notification that appears in a top status bar of the system in a form of a graph or a scroll bar text, for example, a notification of an application running on a background or a notification that appears on the interface in a form of a dialog window. For example, text information is prompted in the status bar, a prompt tone is produced by the notification manager. For example, the electronic device vibrates, or an indicator blinks.

The Android runtime includes a kernel library and a virtual machine. The Android runtime is responsible for scheduling and management of the Android system. The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playing and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The HAL may be a part of a kernel layer. Alternatively, the HAL is an independent layer, is located between the kernel layer and the system library, and is a layer between hardware and software. The HAL may include hardware driver modules, for example, a display driver, a camera driver, and a sensor driver. The application framework layer may invoke the hardware driver module of the HAL.

In a long-focus shooting process described in embodiments of this application, a user opens a camera application. The camera application at the application layer in FIG. 2 is started, and sends an instruction to the HAL, to invoke the camera driver, the sensor driver, and the display driver at the HAL, so that the electronic device can start a camera or a lens to collect an image. In a process in which the camera collects an image, light is transmitted to an image sensor through the camera, and the image sensor performs optical-to-electrical conversion on an optical signal, to convert the optical signal into an image visible to the user. Output image data is transferred to the system library in FIG. 2 in a form of a data stream. The three-dimensional graphics processing library and an image processing library implement drawing, image rendering, composition, layer processing, and the like, to generate display layers. The surface manager performs fusion processing and the like on the display layers, and transfers the display layers to the content provider, the window manager, and the view system of the application framework layer, to control display of a display interface. Finally, the preview image is displayed in an image preview area of the camera application or the display of the electronic device.

For ease of understanding, in the following embodiments of this application, an electronic device having the structures shown in FIG. 1 and FIG. 2 is used as an example to describe a shooting process of the electronic device.

Figure 3:
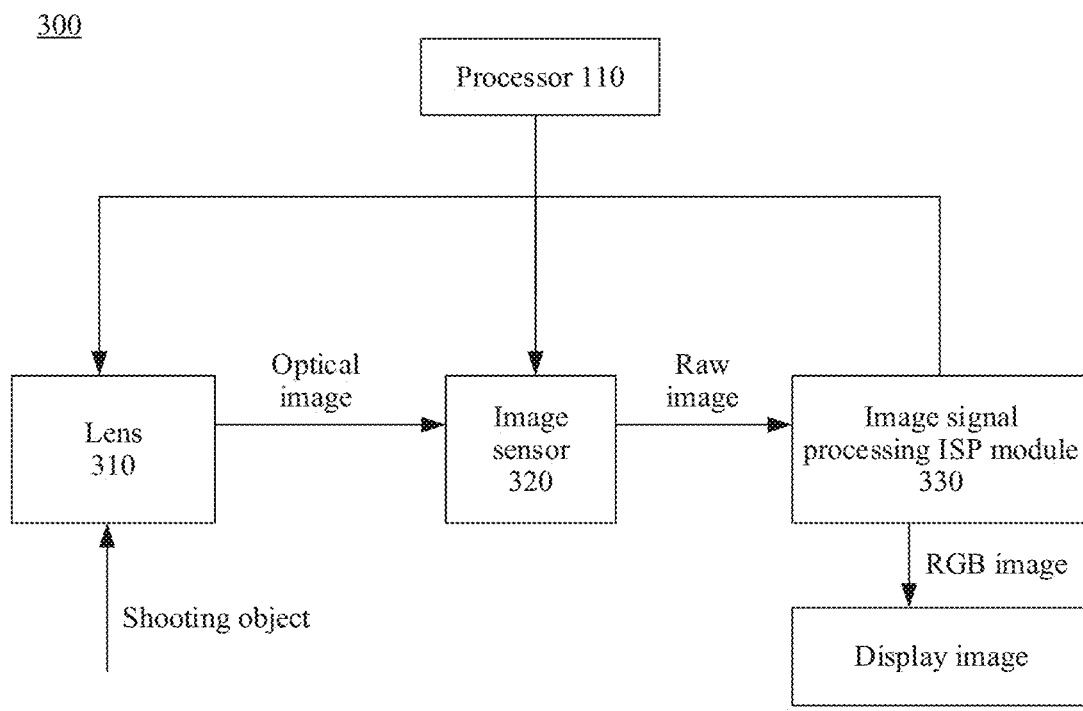
FIG. 3 is a schematic diagram of a control structure of a shooting process of an electronic device according to an embodiment of this application.

FIG. 3 is a schematic diagram of a control structure in a shooting process of an electronic device. The control structure 300 includes a lens 310, an image sensor 320, and an image signal processing (image signal processing, ISP) module 330.

The lens 310 may correspond to the camera 193 of the electronic device 100 in FIG. 1, and is configured to obtain an image. For example, the camera 193 may be embodied as one or more different lenses, such as a wide-angle lens, a main lens, a long-focus lens, or a time of flight (time of flight, TOF) lens. Forms and a quantity of lenses are not limited in embodiments of this application. In embodiments of this application, an example in which the electronic device has a long-focus prime lens is used to describe a process in which the electronic device takes a long-focus photo by using the long-focus prime lens.

The image sensor 320 is a semiconductor chip, and a surface of the image sensor 320 includes hundreds of thousands to millions of photodiodes. When the photodiodes are irradiated by light, electric charges are generated, and are converted into digital signals by using an analog-to-digital converter. The image sensor 320 may be a charge coupled device (charge coupled device, CCD), or may be a complementary metal-oxide semiconductor (complementary metal-oxide semiconductor, CMOS). The CCD may be made of a highly photosensitive semiconductor material and can convert light into electric charges, which are then converted into digital signals by an analog-to-digital converter chip. The CCD consists of many photosensitive units, usually in megapixels. When a surface of the CCD is irradiated by light, each photosensitive unit reflects an electric charge on a component. Signals generated by all the photosensitive units are combined to form a complete picture. That is, an optical image is converted into a raw image. In some embodiments, the image sensor 320 may also be referred to as a photosensitive chip, a photosensitive element, or the like.

The ISP module 330 may process the raw image, perform optimization processing on digital image signals through a series of complex mathematical algorithm operations, and finally transmit processed signals to the display of the electronic device, to be specific, display an image. The ISP module 330 may be correspondingly represented as an independent image processing chip or a digital signal processing chip (digital signal processing, DSP). Alternatively, the ISP module 330 may be a function module corresponding to the processor 110 in the electronic device 100 shown in FIG. 1, and may include logic and firmware (firmware) running on the logic, to quickly transfer data obtained by the photosensitive chip to the processor 110 in a timely manner and refresh the photosensitive chip. In addition, the ISP module 330 may further perform algorithm optimization on noise, brightness, and complexion of an image, and optimize parameters such as an exposure parameter and a color temperature in a shooting scenario.

Specifically, in a shooting process, a user opens a camera, and light is transmitted to the image sensor 320 through the lens 310. In other words, after the lens 310 projects an ambient light signal to a photosensitive area of the image sensor 320, the image sensor 320 converts the ambient light signal into an image visible to naked eyes through optical-to-electrical conversion. Then, an internal raw image (in a Bayer format) is transmitted to the ISP module 330. The ISP module 330 performs algorithm processing, and outputs an image in an RGB spatial domain to a back-end collection unit, to display the image in the image preview area of the electronic device or the display of the electronic device. In this process, the processor 110 performs corresponding control on the lens 310, the image sensor 320, and the ISP module 330 by using firmware (firmware) running on the processor 110, to complete an image preview or shooting function.

The following describes in detail the long-focus shooting method provided in embodiments of this application with reference to the accompanying drawings and an application scenario.

Figure 4A:
FIG. 4(a) to FIG. 4(d) are schematic diagrams of graphical user interfaces of a long-focus shooting process according to an embodiment of this application.
Figure 4B:
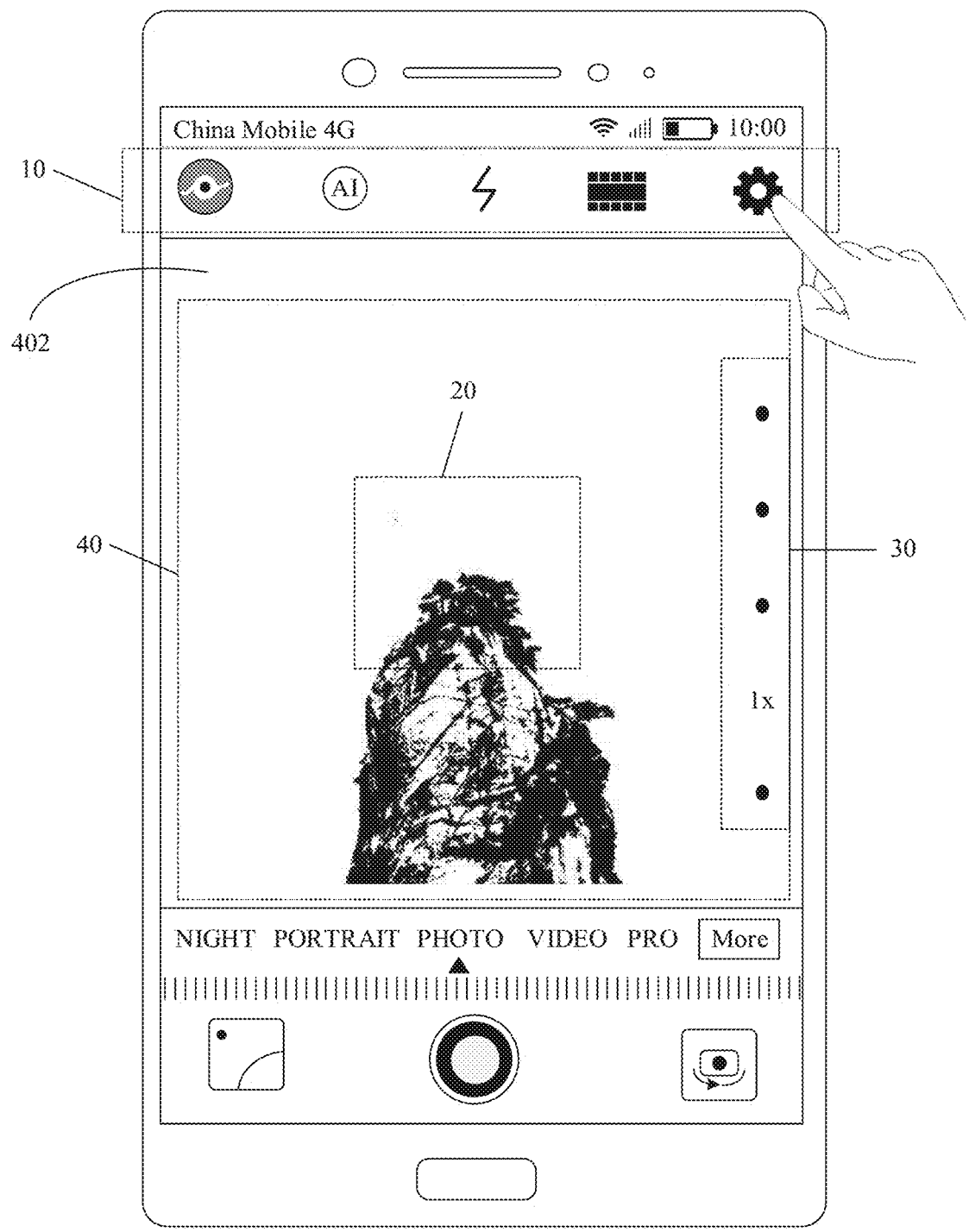
Figure 4C:
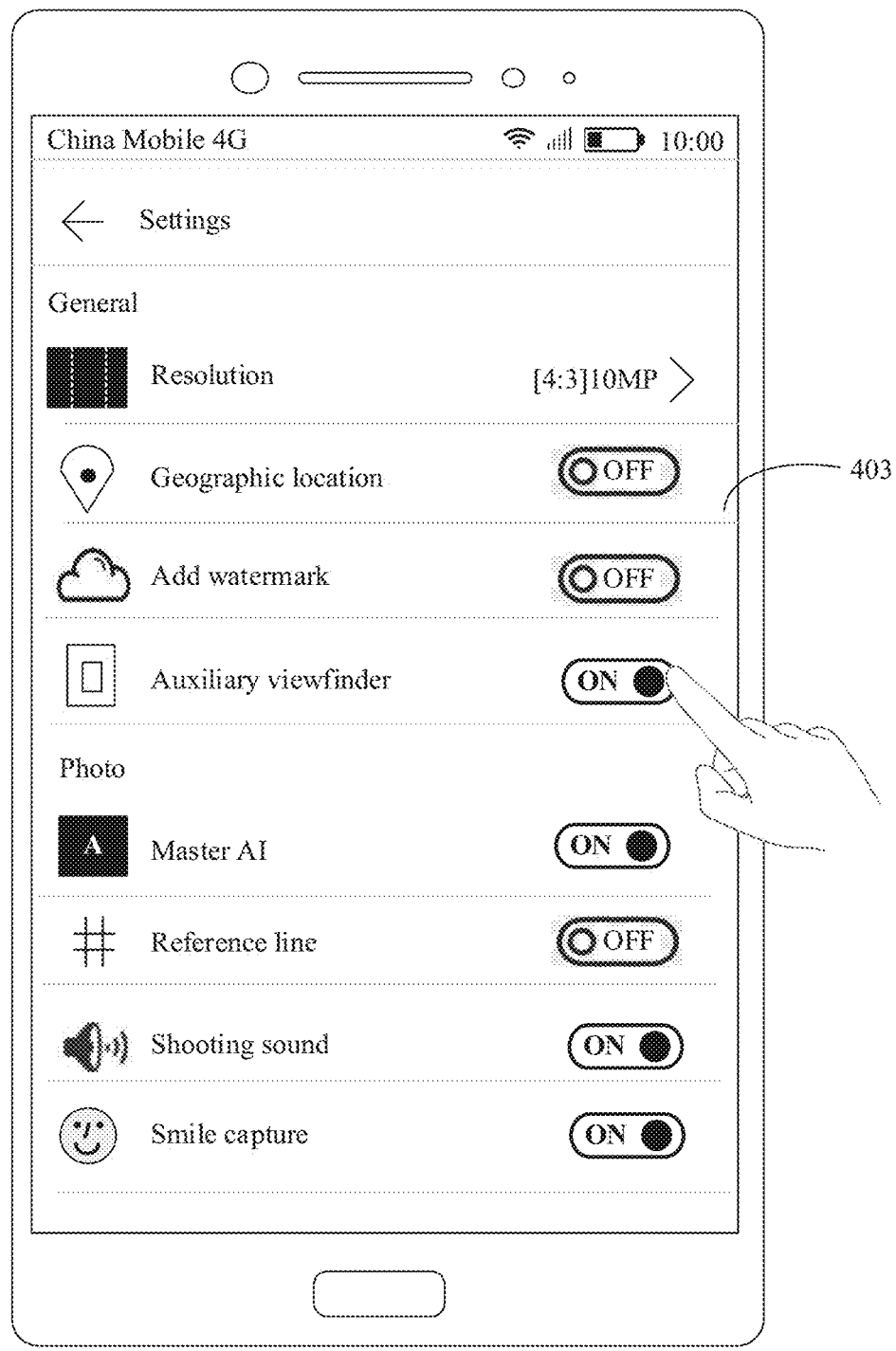

FIG. 4(a) to FIG. 4(d) are a schematic diagram of graphical user interfaces (graphical user interface, GUI) in a long-focus shooting process according to an embodiment of this application. In this application, a mobile phone is used as an electronic device to describe in detail the long-focus shooting method provided in this application. FIG. 4(a) shows currently output interface content 401 that is displayed by a screen display system of the mobile phone in an unlocking mode of the mobile phone. The interface content 401 is a home screen of the mobile phone. The interface content 401 displays a plurality of applications (application, App), for example, applications such as Album, Settings, Music, and Camera. It should be understood that the interface content 401 may further include more applications. This is not limited in this application.

As shown in FIG. 4(*a*), a user taps an icon of a camera application, and in response to the tap operation of the user, the mobile phone enters a preview interface 402 of the camera application shown in FIG. 4(*b*). The preview interface 402 of the camera application includes a plurality of menu areas, and each area includes different buttons that are used to implement various different functions of the camera application. For example, FIG. 4(*b*) shows a top menu area 10, a magnification adjustment area 30, an image preview display area 40, and a bottom menu area of the preview interface 402 of the camera application. It should be understood that a division manner of the areas is not limited in this embodiment of this application. The areas may be adjacent, separated, overlapped, or the like. For ease of description, in this embodiment of this application, areas of the preview interface 402 of the camera application are divided, as shown in dashed-line boxes in the figure.

The top menu area 10 includes a plurality of buttons such as a flashlight button and an artificial intelligence (artificial intelligence, AI) recognition button, to meet different shooting requirements of the user. Details are not described herein. The magnification adjustment area 30 is used to display a magnification in a shooting process. The user may slide on the magnification in the magnification adjustment area 30, to change a preview image for a shooting target by changing a shooting focal length of the mobile phone or a shooting lens.

For example, in FIG. 4(*b*), "1×" indicates that a preview image is obtained by using a main lens (for example, a focal length is 27 millimeters) of the mobile phone, "0.7×" indicates that a preview image is obtained by using a wide-angle lens (for example, a focal length is 16 millimeters) of the mobile phone, "5×" indicates that a preview image is obtained by using a long-focus lens (for example, a focal length is 125 millimeters) of the mobile phone, and a magnification (for example, "25×" and "50×") greater than "5×" indicates that an image is currently obtained through digital zoom. For example, the preview image obtained at "50×" is obtained after processing such as cutting is performed on a center of an original framed picture of the long-focus lens of the mobile phone at "5×". Therefore, a framed area at "50×" occupies only 1/100 of a framed area of the mobile phone at "5×".

As shown in FIG. 4(*b*), the preview interface 402 of the camera application currently displays a framed picture at "1×": a tree-covered mountain. At the magnification "1×", a full view of the mountain can be seen. When a shooting target expected by the user is trees at the top of the mountain in a dashed-line box 20 in FIG. 4(*b*), a shooting magnification of the camera may be adjusted. The user taps a setting icon in the top menu area 10 of the preview interface 402, and in response to the tap operation of the user, the mobile phone enters a camera setting interface 403 shown in FIG. 4(*c*). The camera setting interface 403 includes a plurality of menu bars, for example, Resolution, Geographical location, Add watermark, Master AI, Reference line, Shooting sound, and Smile capture. Functions of the foregoing menus are not described in detail in this embodiment of this application.

In a possible implementation, in this embodiment of this application, on the camera setting interface 403, a switch for enabling a long-focus shooting function, that is, an auxiliary framed picture, is provided for the user. For example, as shown in FIG. 4(*c*), the user taps the auxiliary framed picture switch, so that the auxiliary framed picture switch is in an on ("ON") state. That is, the long-focus shooting function provided in this embodiment of this application is enabled. When the user enables the long-focus shooting function, the preview interface of the camera application is displayed. If the user adjusts and increases a magnification, as shown in FIG. 4(*d*), an auxiliary viewfinder frame 50 is further displayed on the preview interface 404. The auxiliary viewfinder frame 50 may display a framed picture at "5×" in FIG. 4(*b*), and the image preview display area 40 displays a magnified framed picture.

It should be understood that this embodiment of this application describes a long-focus shooting process of the mobile phone. When the magnification is "5×", the camera enters a long-focus shooting mode, that is, framing is performed by using the long-focus lens. As the magnification increases, framing is performed by using the long-focus lens. Preview images at different magnifications are obtained after processing such as cropping is performed on the framed picture of the long-focus lens at "5×". A shooting process at a magnification less than "5×" and a process of obtaining a preview image are not limited in embodiments of this application.

Optionally, when the user enables the auxiliary framed picture switch and the preview interface 404 of the camera application is displayed, the auxiliary viewfinder frame 50 is continuously displayed on the preview interface 404. If the user has not adjusted the magnification, that is, if the magnification is "1×", the auxiliary viewfinder frame 50 and the image preview display area 40 may have a same preview image, which is a framed picture obtained by the main lens of the mobile phone. After the user adjusts and increases the magnification to "50×", the auxiliary viewfinder frame 50 may display the framed picture at "5×" in FIG. 4(*b*), and the image preview display area 40 displays a framed picture that is magnified to "50×".

Optionally, when the user enables the auxiliary framed picture switch and the preview interface 404 of the camera application is displayed, the auxiliary viewfinder frame 50 is not displayed. When the user adjusts and increases the magnification to be greater than or equal to a specific threshold (for example, "10×"), the auxiliary viewfinder frame 50 is displayed on the preview interface 404. For example, the user enables the auxiliary framed picture switch, and the preview interface 404 of the camera application is displayed. When the magnification is currently "1×", the auxiliary viewfinder frame 50 is not displayed. When the user slides to adjust the magnification to "10×", the auxiliary viewfinder frame 50 is displayed on the preview interface 404, the auxiliary viewfinder frame 50 may display the framed picture at "5×" in FIG. 4(*b*), and the image preview display area 40 displays the framed picture that is magnified to "10×".

In another possible implementation, the switch for enabling the long-focus shooting function, that is, the auxiliary framed picture switch, may be set in any position on the preview interface 402 of the camera application. For example, the auxiliary framed picture switch is set in the top menu area 10. The user does not need to enable the long-focus shooting function by setting a button, but directly taps the auxiliary framed picture switch in the top menu area 10, to enable the long-focus shooting function, and the auxiliary viewfinder frame 50 is displayed.

In another possible implementation, the long-focus shooting function is enabled by default, and the auxiliary framed picture switch is not set in the camera application. When it is determined that current shooting meets a preset condition, the auxiliary viewfinder frame 50 is automatically displayed on the preview interface 402 of the camera application.

Optionally, the preset condition may be that it is determined that the user slides to adjust the magnification to be greater than or equal to "10×". For example, when the user slides to adjust the magnification to be equal to "10×", the auxiliary viewfinder frame 50 is automatically displayed on the preview interface 402 of the camera application, the auxiliary viewfinder frame 50 may display the framed picture at "5×" in FIG. 4(b), and the image preview display area 40 displays a framed picture that is magnified to "10×".

It should be understood that, in this embodiment of this application, the provided auxiliary viewfinder frame 50 may be used to display the framed picture obtained by the long-focus lens of the mobile phone at "5×", and the image preview display area 40 displays a framed picture obtained after the user adjusts the magnification. During long-focus shooting, according to the method, two viewfinder frames may be simultaneously displayed in the image preview display area 40, and the two viewfinder frames provide the user with preview pictures in two different fields of view. For an electronic device that has a long-focus prime lens and whose lens axis cannot be rotated, this method can make it easier for a user to find a subject of a shooting target in a long-focus shooting process.

In a possible implementation, the auxiliary viewfinder frame 50 includes a close button 70. The close button 70 may be located at an upper right corner of the auxiliary viewfinder frame 50. The user may close the auxiliary viewfinder frame 50 by tapping the close button 70. For example, when the user completes focusing, and the subject of the shooting target is displayed in the image preview area 40, the user may close the auxiliary viewfinder frame 50, so that there may be a larger image preview area, and it is convenient for the user to view an image preview picture.

Figure 4D:
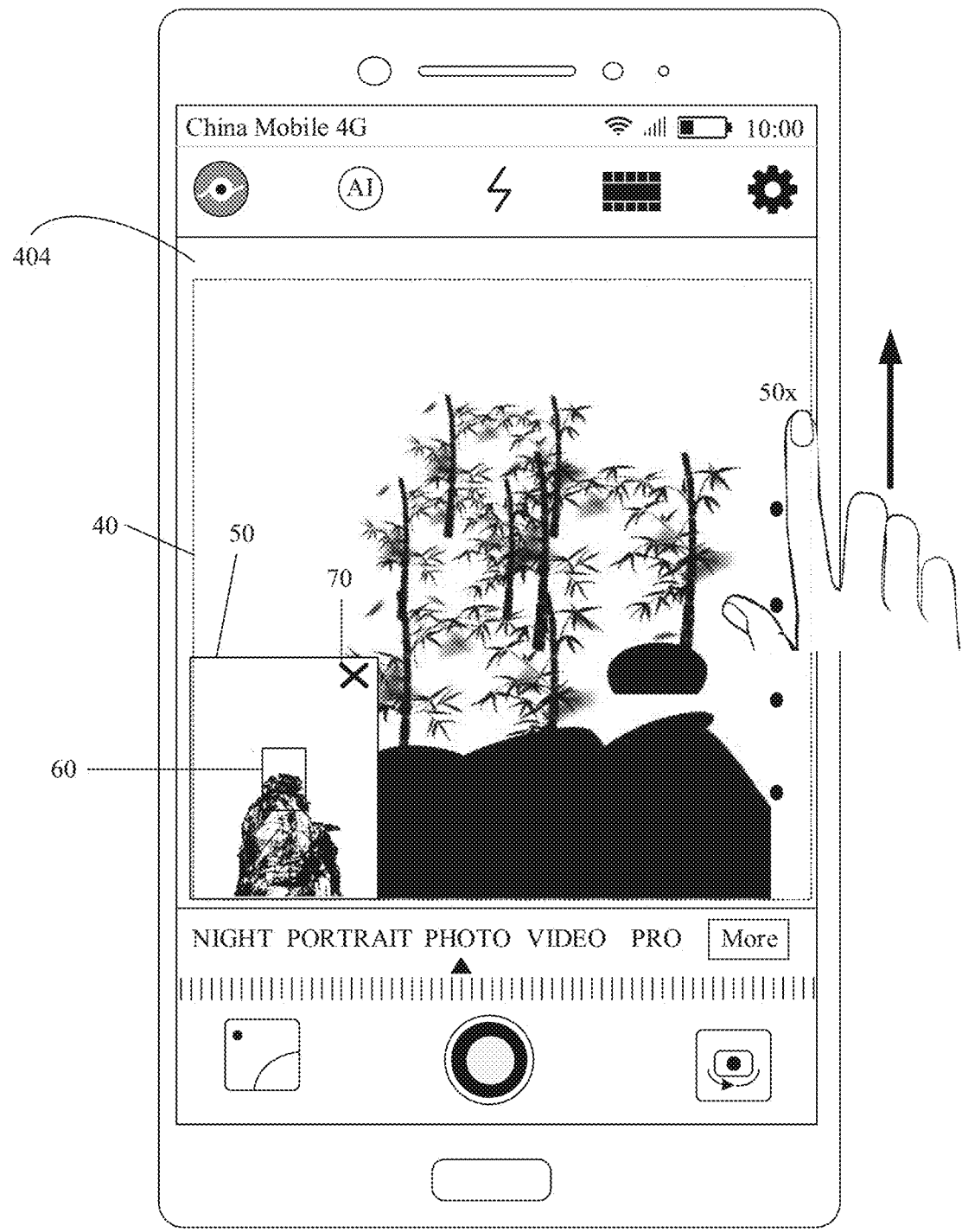

In a possible implementation, the auxiliary viewfinder frame 50 includes a target area, and the target area is used to determine a subject of a shooting target. For example, as shown in FIG. 4(d), the auxiliary viewfinder frame 50 includes a target area 60, and the target area 60 is used to determine "the trees at the top of the mountain" that the user expects to shoot. When the user adjusts the magnification to "50×" for long-focus shooting, the user moves "the trees at the top of the mountain" to the target area 60 by using the auxiliary viewfinder frame 50, adjusting an angle of the lens of the mobile phone, and the like. In this way, it can be ensured that the image preview display area 40 presents the trees at the top of the mountain that are magnified to "50×".

When the magnification is adjusted to "50×" for shooting, the FOV of the mobile phone is only about 0.5 degrees. When the user slightly moves the mobile phone or shake occurs during shooting, the shake and deviation are magnified. As a result, the picture in the image preview display area 40 deviates greatly, and the shooting target deviates to the image preview display area 40. In this case, it is difficult for the user to find the shooting target. By using the auxiliary viewfinder frame 50, the user can intuitively know and adjust an operation such as manually adjusting an angle of the lens of the mobile phone, and move "the trees at the top of the mountain" to the target area 60, so that the shooting target "the trees at the top of the mountain" is displayed in the image preview display area 40. Therefore, the method can improve operation efficiency.

Optionally, the auxiliary viewfinder frame 50 is displayed in a lower left corner of the image preview display area 40 of the mobile phone, and the target area 60 may be located in a central position of the auxiliary viewfinder frame 50. For example, as shown in FIG. 4(d), the auxiliary viewfinder frame 50 is located in the lower left corner of the image preview display area 40, and the target area 60 may be located in a central area of the auxiliary viewfinder frame 50. In this display manner, covering of the auxiliary viewfinder frame 50 on the image preview display area 40 can be reduced, and it is convenient for the user to quickly display "the trees at the top of the mountain" in the image preview display area 40.

Figure 5A:
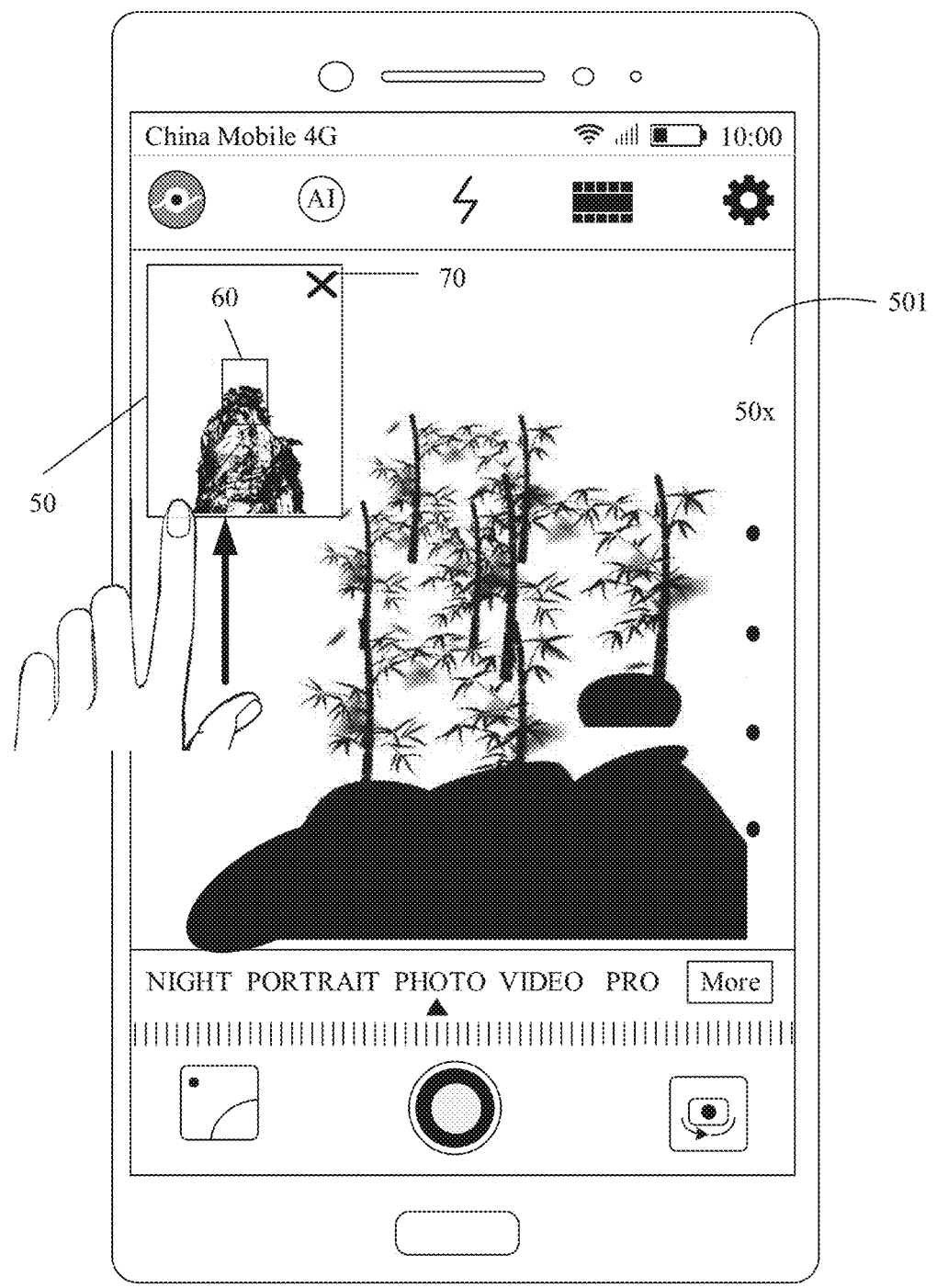
FIG. 5(a) and FIG. 5(b) are schematic diagrams of graphical user interfaces of another long-focus shooting process according to an embodiment of this application.
Figure 5B:
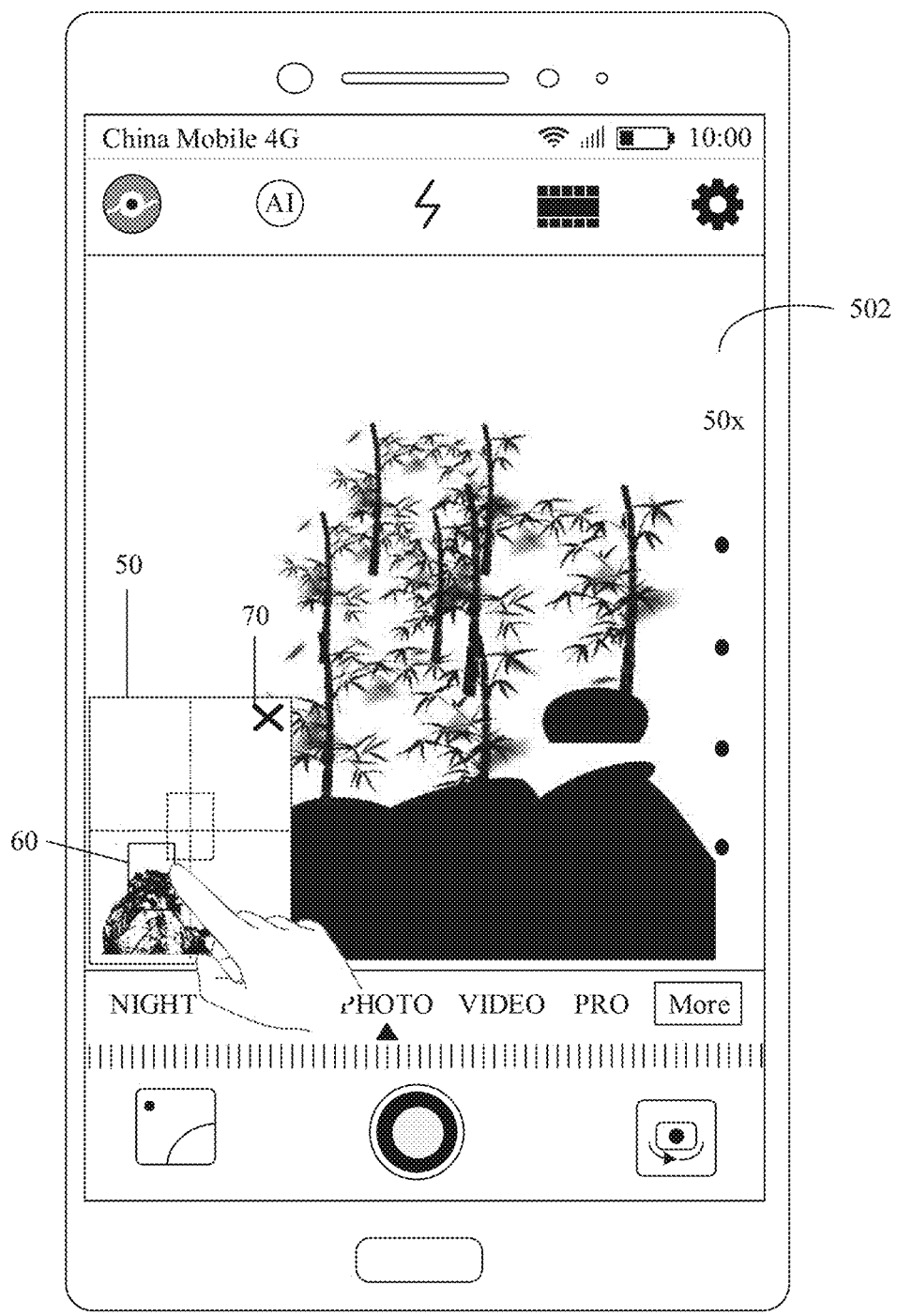

In a possible implementation, the auxiliary viewfinder frame 50 may move in the image preview display area 40 based on a user operation. FIG. 5(a) and FIG. 5(b) are schematic diagrams of graphical user interfaces of another long-focus shooting process according to an embodiment of this application. For example, as shown in FIG. 5(a), the user taps any position of the auxiliary viewfinder frame 50, and drags the auxiliary viewfinder frame 50 in an upward direction. In response to the drag operation of the user, the auxiliary viewfinder frame 50 moves from a lower left corner to an upper left corner of the image preview display area 40.

According to the foregoing method, the user may move the auxiliary viewfinder frame 50 based on an image currently displayed in the image preview display area 40, to minimize covering of the auxiliary viewfinder frame 50 on the image displayed in the image preview display area 40.

Optionally, a position of the target area 60 in the auxiliary viewfinder frame 50 may also be moved based on a user operation. For example, when the user fixes the mobile phone by using an apparatus such as a tripod, a shooting angle of the mobile phone is fixed. Consequently, in the auxiliary viewfinder frame 50, the shooting target is not located in the central area of the auxiliary viewfinder frame 50. As shown in FIG. 5(b), in the auxiliary viewfinder frame 50, the shooting target "the trees at the top of the mountain" is displayed in a lower left area of the auxiliary viewfinder frame 50. In this case, a preview image of the trees at the top of the mountain cannot be displayed in the image preview display area 40. The user may perform the operation shown in FIG. 5(b), tap any position in the target area 60, and drag the target area 60 to the lower left, so that the target area 60 includes the shooting target, that is, "the trees at the top of the mountain". In response to the drag operation of the user, a position of the target area 60 in the auxiliary viewfinder frame 50 changes. When the target area 60 includes "the trees at the top of the mountain", the image preview display area 40 may display the trees at the top of the peak that the user expects to shoot.

It should be understood that when the image preview area 40 and the auxiliary viewfinder frame 50 are simultaneously displayed, a picture in the image preview area 40 is obtained after a picture in the target area 60 in the auxiliary viewfinder frame 50 is magnified. For example, long-focus shooting at "50×" shown in FIG. 4(d) is used as an example. There is a picture obtained by the long-focus lens of the mobile phone at "5×" in the auxiliary viewfinder frame 50. The camera application may determine a position of the target area 60 in the auxiliary viewfinder frame 50, and determine a range of a picture circled by the target area 60, to determine image data included in the picture of the target area 60. The camera application runs on the processor 110, that is, the processor 110 may learn of position information of the target area 60. The processor 110 sends the position information of the target area 60 to the ISP module 330, and the ISP module 330 performs, based on the position information of the target area 60, cropping processing on a picture obtained by the long-focus lens at "5×" to obtain a new picture, and further transfers image data of the new picture that is magnified to "50×" to the HAL and the application layer for displaying.

Finally, a picture obtained after the picture of the target area 60 is magnified to "50×" is displayed in the image preview area 40. Similarly, regardless of whether the target area 60 is a fixed area or an area that can be manually dragged by the user, the camera application may determine the position information of the target area 60, and further magnify or the like the picture included in the target area 60. Details are not described herein.

According to the foregoing method, the user can move the target area 60 in the auxiliary viewfinder frame 50 based on a current shooting requirement, so that the user can quickly find the shooting target without changing a shooting angle of the mobile phone or the lens.

The foregoing describes, with reference to FIG. 4(*a*) to FIG. 4(*d*) and FIG. 5(*a*) and FIG. 5(*b*), a plurality of methods for displaying the auxiliary viewfinder frame 50 on the preview interface 404 of the camera application by enabling the long-focus shooting function. The following describes an internal implementation process of long-focus shooting with reference to FIG. 6A, FIG. 6B, and FIG. 7.

Figure 6A:
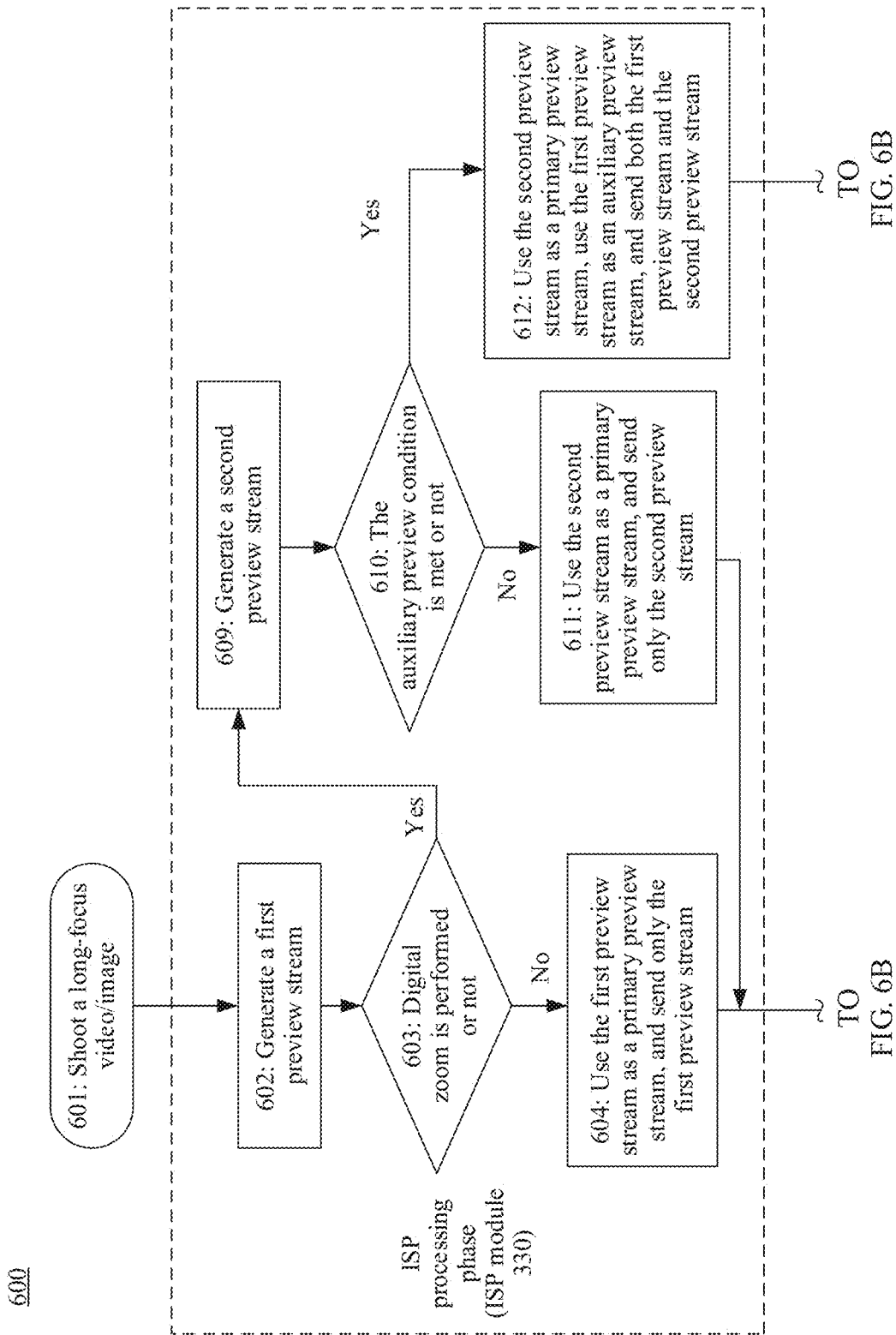
FIG. 6A and FIG. 6B are an implementation flowchart of a long-focus shooting process according to an embodiment of this application.
Figure 6B:
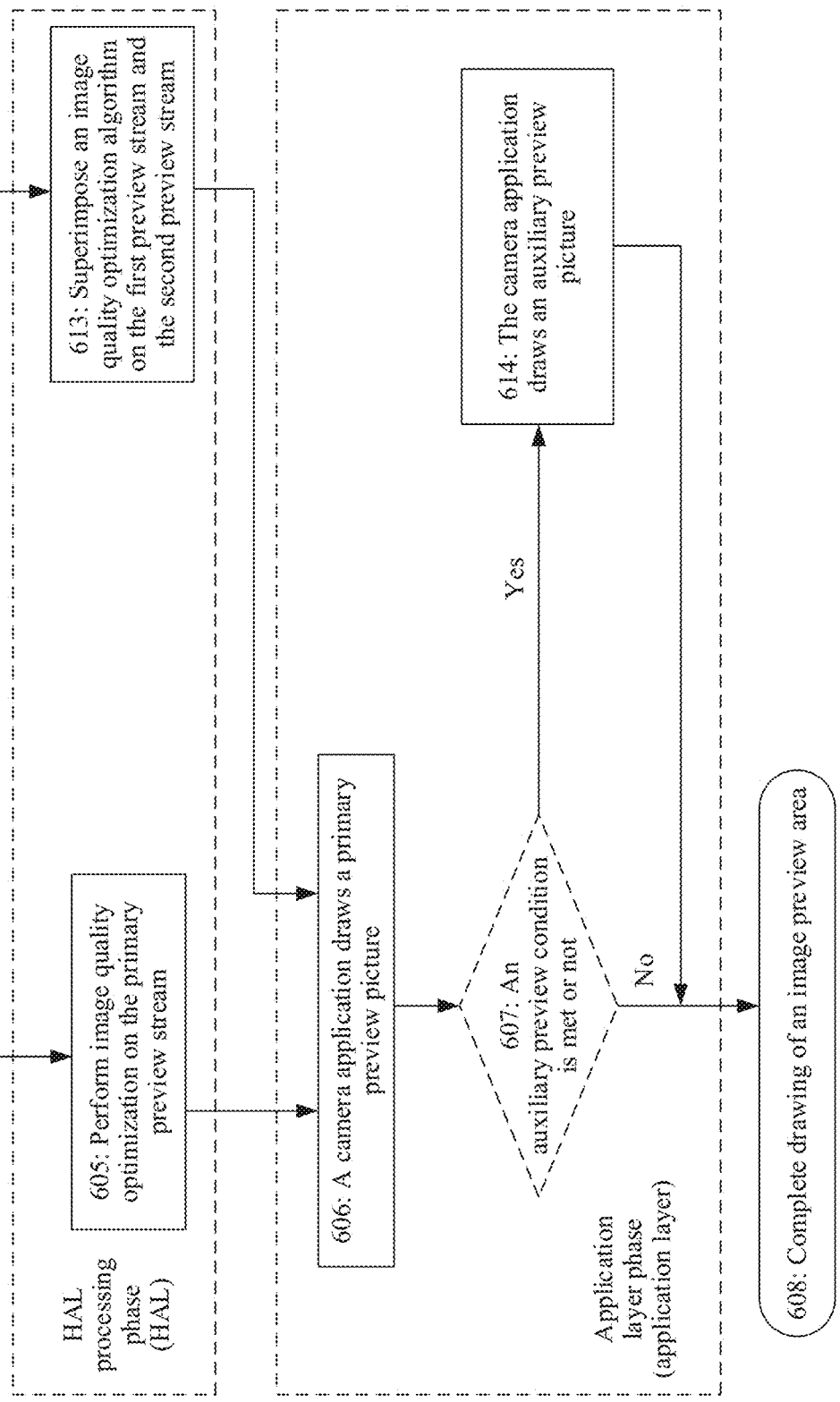

FIG. 6A and FIG. 6B are an implementation flowchart of a long-focus shooting process according to an embodiment of this application. As shown in FIG. 6A and FIG. 6B, an implementation process of a method 600 may be divided into three phases: an ISP processing phase, an HAL processing phase, and an application layer processing phase. With reference to the software architecture in FIG. 2 and the control structure of the shooting process in FIG. 3, the ISP processing phase may be executed by the ISP module 330, the HAL processing phase and the application layer processing phase are executed by the processor 110, the HAL processing phase is correspondingly executed at the HAL, and the application layer processing phase is executed at the application layer. Specifically, the method 600 includes the following steps.

601: The mobile phone enters a long-focus shooting mode.

It should be understood that the "long-focus shooting mode" described in this embodiment of this application may be understood as obtaining a current preview image by a long-focus lens of the mobile phone. For example, the mobile phone may obtain an original framed picture by using the long-focus lens of the mobile phone when a magnification is greater than "5×". A preview image at a magnification such as "25×" or "50×" is obtained after processing such as cropping is performed from a center of the original framed picture obtained at "5×".

It should be further understood that, in this embodiment of this application, the long-focus shooting mode is not limited to a shooting mode or a video recording mode of the mobile phone. In other words, the mobile phone may take a photo or record a video in the long-focus shooting mode.

Optionally, the user may slide on a magnification in the magnification adjustment area 30 of the mobile phone. When the magnification reaches a first threshold (for example, "5×"), the mobile phone automatically switches a lens to be in the long-focus shooting mode, and obtains the original framed picture by using the long-focus lens of the mobile phone. Alternatively, the lens may enter the long-focus shooting mode in another manner such as user setting. This is not limited in this embodiment of this application.

602: The ISP module 330 of the mobile phone generates a first preview stream.

With reference to related descriptions in FIG. 2 and FIG. 3, the first preview stream may also be referred to as an "original preview stream". It may be understood that an optical signal obtained by the lens 310 sequentially undergoes algorithm processing of the image sensor 320 and the ISP module 330, and image data in an RGB spatial domain is output. The image data may be sent, in a form of a data stream, to a display unit of the mobile phone, for example, the surface manager and the three-dimensional graphics processing library in the system library in FIG. 2, to complete image rendering, composition, layer processing, and the like, for final display in an image preview area of the display of the mobile phone.

603: The ISP module 330 of the mobile phone determines whether digital zoom is currently performed.

It should be understood that, in this embodiment of this application, digital zoom may be understood as follows: In a long-focus shooting process, if an image is obtained after processing such as cropping is performed on an original framed picture obtained at a specific magnification (for example, "5×"), this process is a digital zoom process.

Optionally, the ISP module 330 of the mobile phone may determine, based on whether a current magnification is greater than or equal to a second threshold, whether digital zoom is currently performed. It should be understood that the second threshold may be greater than or equal to the first threshold. When the second threshold is equal to the first threshold, for example, when both the second threshold and the first threshold are "5×", that is, when the mobile phone enters the long-focus shooting mode, a process of obtaining an image is a digital zoom process. When the second threshold is greater than the first threshold, for example, when the first threshold is "5×" and the second threshold is "10×", that is, when the magnification is "5×", the mobile phone enters the long-focus shooting mode; and when the magnification is "10×", a process of obtaining an image is a digital zoom process.

604: When determining that a current image obtaining manner is not a digital zoom process, the ISP module 330 of the mobile phone uses the first preview stream as a primary preview stream, and sends only the first preview stream to the HAL.

It should be understood that the "primary preview stream" herein may be understood as image data that is in the RGB spatial domain and that is displayed in the image preview display area 40. Similarly, in this application, image data that is in the RGB spatial domain and that is displayed in the auxiliary viewfinder frame 50 may be referred to as an "auxiliary preview stream".

The foregoing steps 601 to 604 are the ISP processing procedure completed by the ISP module 330. The ISP module 330 sends the first preview stream to the HAL.

605: The HAL of the mobile phone performs image quality optimization on the primary preview stream, and sends processed image data of the primary preview stream to the application layer.

Specifically, under control of the processor 110, the HAL of the mobile phone may superimpose an image quality optimization algorithm on the first preview stream, for example, an optimization algorithm such as color temperature adjustment, noise reduction processing, smoothing processing, or white balance processing. A type and a method of the optimization algorithm are not limited in this embodiment of this application.

606: A camera application at the application layer of the mobile phone draws a primary preview picture in the image preview area.

A process of step 606 may be understood as follows: The ISP module 330 of the mobile phone transfers the image data of the first preview stream to the processor 110, and the processor 110 controls the surface manager, the three-dimensional graphics processing library, and the like in the system library in FIG. 2 to complete image rendering, composition, layer processing, and the like, and finally display the image data in the image preview area of the display of the mobile phone.

607: The camera application of the mobile phone determines whether an auxiliary preview condition is currently met.

A determining process of step 607 may be agreed on by the ISP module 330 and the application layer. When the ISP module 330 determines that the current image obtaining manner is not a digital zoom process and the auxiliary preview condition is not met, the camera application may determine that the auxiliary preview condition is not met. Alternatively, when the ISP module 330 determines that the current image obtaining manner is not a digital zoom process, the camera application may not perform step 607.

608: Complete drawing of an image preview interface.

The foregoing steps 601 to 604 are the ISP processing procedure completed by the ISP module 330. In other words, if the first preview stream is processed in the HAL processing phase in step 605, and the primary preview picture is displayed in the image preview area in step 606, an image visible to a user may be output in the image preview area of the camera application. The foregoing is the entire process of displaying a preview picture at "1×" by the mobile phone.

609: If the ISP module 330 of the mobile phone determines, in step 603, that the current image obtaining manner is a digital zoom process, the ISP module 330 generates a second preview stream.

Optionally, when a current magnification is greater than or equal to a second threshold, for example, greater than "5×", the ISP module 330 of the mobile phone determines that the current image obtaining manner is a digital zoom process.

The second preview stream may also be referred to as a "digital zoom preview stream", and may be understood as output image data that is in the RGB spatial domain and that corresponds to a framed picture obtained after processing such as cropping is performed on the original framed picture obtained at "5×" starting from a center. For example, when the user adjusts the magnification to "10×" to perform shooting, the second preview stream is output image data corresponding to a framed picture at "10×".

610: The ISP module 330 of the mobile phone determines whether an auxiliary preview condition is currently met.

Optionally, a determining process in step 610 may be: determining whether the user turns on an auxiliary framed picture switch. For example, in the method described in FIG. 4(b) and FIG. 4(c), the user manually turns on the auxiliary framed picture switch, that is, the ISP module 330 of the mobile phone determines that the auxiliary preview condition is currently met.

Alternatively, the long-focus shooting function is enabled by default, and the user may not manually turn on the auxiliary framed picture switch. When the mobile phone determines that current shooting meets a preset condition, the ISP module 330 of the mobile phone determines that the auxiliary preview condition is currently met. For example, the preset condition may be that the mobile phone determines that a current shooting magnification is greater than or equal to "10×".

When any one of the foregoing conditions is met, if the ISP module 330 of the mobile phone determines that the auxiliary preview condition is currently met, the auxiliary viewfinder frame 50 is automatically displayed on a preview interface of the camera application, and step 612 is performed. Otherwise, if the ISP module 330 of the mobile phone determines that the auxiliary preview condition is not met currently, the auxiliary viewfinder frame 50 is automatically displayed on the preview interface of the camera application, and step 611 is performed.

611: When the ISP module 330 of the mobile phone determines that the auxiliary preview condition is not met currently, the ISP module 330 of the mobile phone uses the second preview stream as a primary preview stream, and sends only the second preview stream.

Then, step 605, step 606, and step 608 continue to be performed. Only the second preview stream is used as the primary preview stream, and image quality optimization is performed on the second preview stream by using the HAL. The processed data stream is sent to the display unit of the mobile phone. The primary preview picture is displayed in the image preview area of the camera application at the application layer of the mobile phone. That is, an image visible to the user is output in the image preview area of the camera application. In an example in which the user takes a photo at a magnification "9×", the foregoing is an entire process of displaying a magnified preview picture at "9×" by the mobile phone.

612: When the ISP module 330 of the mobile phone determines that the auxiliary preview condition is currently met, the ISP module 330 of the mobile phone uses the second preview stream as a primary preview stream, uses the first preview stream as an auxiliary preview stream, and sends both the first preview stream and the second preview stream to the HAL.

It should be understood that when the ISP module 330 of the mobile phone determines that the auxiliary preview condition is currently met, as shown in FIG. 4(d) or FIG. 5(a) and FIG. 5(b), the auxiliary viewfinder frame 50 may be automatically displayed on the preview interface of the camera application. For example, the user performs shooting at a magnification "50×". As shown in FIG. 4(d), the image preview display area 40 of the mobile phone displays a magnified preview picture at "50×", and the preview picture corresponds to image data included in the "second preview stream" (or referred to as the "primary preview stream"). The auxiliary viewfinder frame 50 of the mobile phone displays the original framed picture at "5×", and the original framed picture of the auxiliary viewfinder frame 50 corresponds to image data included in the "first preview stream" (or referred to as the "auxiliary preview stream"). The ISP module 330 of the mobile phone sends both the first preview stream and the second preview stream to the HAL, that is, reports image data of the two preview streams. Image data reporting processes of the two preview streams may be simultaneously performed. It should be understood that the image data reporting processes of the two preview streams are not limited in this embodiment of this application.

613: Perform image quality optimization on the first preview stream and the second preview stream at the HAL of the mobile phone. For the process, refer to related descriptions of step 605. Details are not described herein again.

606: The camera application at the application layer of the mobile phone draws a primary preview picture in the image preview area.

607: The camera application of the mobile phone determines whether the auxiliary preview condition is currently met.

For a determining process of step 607, refer to the determining process of the ISP module 330 in step 610. The determining process may be agreed on by the ISP module 330 and the application layer, and is shown by using a dashed box in FIG. 6A and FIG. 6B. It should be understood that step 607 may be consistent with step 610, and the camera application may not perform step 607.

For example, when the ISP module 330 determines, in step 610, that the auxiliary preview condition is currently met, the camera application may also know that the auxiliary preview condition is currently met, so as to draw the primary preview picture based on the processed image data of the second preview stream sent to the application layer by using step 606, that is, display the magnified preview picture at "50×" in the image preview display area 40, and draw the auxiliary preview picture based on the processed image data of the first preview stream sent to the application layer by using step 614, that is, display the original framed picture at "5×" in the auxiliary viewfinder frame 50.

Alternatively, when the ISP module 330 determines, in step 610, that the auxiliary preview condition is not met currently, the camera application may also know that the auxiliary preview condition is not met currently, to draw the primary preview picture based on the processed image data of the second preview stream sent to the application layer by using step 606, that is, display the magnified preview picture at "50×" in the image preview display area 40, and not display the auxiliary viewfinder frame 50.

According to the processes of steps 601 to 603, 609 and 610, 612 and 613, 606, 607, 614, and 608 described above, the primary preview picture that is magnified to "50×" may be displayed in the image preview area, and the original framed picture at "5×" may be displayed in the auxiliary viewfinder frame 50. For example, as shown in FIG. 4(d), the auxiliary viewfinder frame 50 is used to display the original framed picture obtained by the long-focus lens of the mobile phone at "5×", that is, the entire mountain, and the image preview display area 40 displays the framed picture obtained after the user adjusts the magnification to "50×", that is, the trees at the top of the mountain. During long-focus shooting, according to the method, two viewfinder frames may be simultaneously displayed in the image preview display area 40, and the two viewfinder frames provide the user with preview pictures in two different fields of view. For an electronic device that has a long-focus prime lens and whose lens axis cannot be rotated, this method can make it easier for a user to find a subject of a shooting target in a long-focus shooting process.

Display of the target area 60 in the auxiliary viewfinder frame 50 may be controlled by the camera application. When detecting that the subject of the shooting target in the auxiliary viewfinder frame 50 deviates from the central area, the mobile phone may automatically display the target area 60, so that the user adjusts an angle of a lens of the mobile phone, the subject of the shooting target is moved to the target area 60, and the subject of the shooting target is more easily found.

In addition, position coordinates of the auxiliary viewfinder frame 50 on the display may be determined in a plurality of manners.

Figure 7:
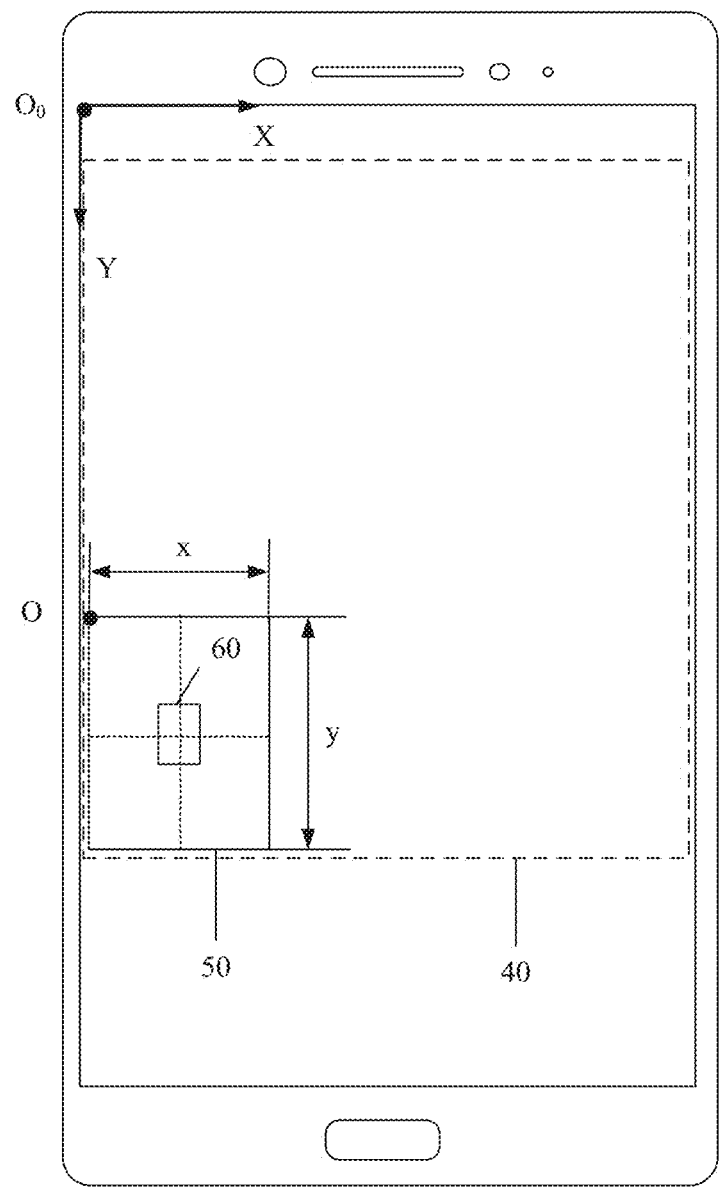
FIG. 7 is a schematic diagram of coordinates on an interface of a mobile phone according to an embodiment of this application.

FIG. 7 is a schematic diagram of coordinates on an interface of a mobile phone according to an embodiment of this application. As shown in FIG. 7, for the display of the mobile phone, a start point $O_0$ at an upper left corner of the display is used as an origin of coordinates, and pixels in a horizontal direction (an X-axis direction) and a vertical direction (a Y-axis direction) are used to represent a size of the display. The size of the display of the mobile phone is 640×960, indicating that the display includes 640 pixels in the X-axis direction and 960 pixels in the Y-axis direction. In subsequent description of coordinates, a number is a position coordinate of a pixel. It should be understood that a larger quantity of pixels occupied in a direction indicates a more refined and delicate display effect.

In a possible implementation, the position coordinates of the auxiliary viewfinder frame 50 on the display may be coordinates preset in the camera application. For example, the mobile phone may specify initial vertex coordinates O, a quantity x of pixels included in the X-axis direction, and a quantity y of pixels included in the Y-axis direction for the auxiliary viewfinder frame 50. For example, after initial vertex coordinates O (0, 320), a quantity 100 of pixels included in the X-axis direction is, and a quantity 150 of pixels included in the Y-axis direction are specified, the auxiliary viewfinder frame 50 may be displayed in a lower right corner of the image preview area 40 of the display, as shown in FIG. 4(d).

Optionally, the mobile phone 100 may determine, based on a picture currently displayed in the image preview area 40 of the camera application of the mobile phone, the coordinates and the size of the auxiliary viewfinder frame 50 displayed in the image preview area 40. For example, when the mobile phone detects that the shooting target, namely, the trees at the top of the mountain, in the framed picture in the image preview area 40 is close to the right side of the mobile phone, a left blank area other than the shooting target is greater than the right area, and the auxiliary viewfinder frame 50 is initially displayed in the upper left corner shown in FIG. 5(a). In this display manner, the magnification adjustment area 30 on the right may not be covered, to facilitate a user operation.

It should be understood that, in the method described in FIG. 5(a), the auxiliary viewfinder frame 50 of the mobile phone herein may receive a drag operation of the user, and move in the image preview display area 40. After the auxiliary viewfinder frame 50 moves, the camera application may re-determine new coordinates of the auxiliary viewfinder frame 50, and update coordinate information of the auxiliary viewfinder frame 50, to ensure that the image data included in the first preview stream is accurately displayed in the auxiliary viewfinder frame 50.

Similarly, as shown in FIG. 5(b), the target area 60 in the auxiliary viewfinder frame 50 may also receive a drag operation of the user, and both changed coordinate information of the target area 60 and the subject of the shooting target circled in the target area 60 may be obtained by the camera. Therefore, in a digital zoom processing process, when processing such as cropping is performed on the obtained original framed picture, the subject of the shooting target circled in the target area 60 is accurately processed, and the second preview stream is further generated. Details are not described herein again.

According to the foregoing method, the user can move the target area 60 in the auxiliary viewfinder frame 50 based on a current shooting requirement, so that the user can quickly find the shooting target without changing a shooting angle of the mobile phone or the lens.

It may be understood that, to implement the foregoing functions, the electronic device includes corresponding hardware and/or software modules for performing the functions. Algorithm steps in examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into function modules based on the example in the foregoing method. For example, each function module such as a detection unit, a processing unit, or a display unit corresponding to each function may be obtained through division, or two or more functions may be integrated into one processing module. The integrated module may be implemented in a form of hardware. It should be noted that, in embodiments, division into modules is an example and is merely logical function division. During actual implementation, there may be another division manner.

It should be noted that all related content of the steps in the foregoing method embodiments may be cited in function descriptions of corresponding function modules. Details are not described herein again.

The electronic device provided in this embodiment is configured to perform the long-focus shooting method. Therefore, an effect same as the effect of the foregoing implementation methods can be achieved.

When an integrated unit is used, the electronic device may alternatively include a processing module, a storage module, and a communications module. The processing module may be configured to control and manage an action of the electronic device. The storage module may be configured to support the electronic device to store program code, data, and the like. The communications module may be configured to support communication between the electronic device and another device.

The processing module may be a processor or a controller. The processing module may implement or execute various example logical blocks, modules, and circuits described with reference to content disclosed in this application. The processor may alternatively be a combination, for example, a combination including one or more microprocessors or a combination of digital signal processing (digital signal processing, DSP) and a microprocessor, for implementing a computing function. A storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device having the structure shown in FIG. 1.

Embodiments further provide a computer storage medium. The computer storage medium stores computer instructions. When the computer instructions are run on an electronic device, the electronic device is enabled to perform the related method steps, to implement the long-focus shooting method in the foregoing embodiments.

Embodiments further provide a computer program product. When the computer program product is run on a computer, the computer is enabled to perform the foregoing related steps, to implement the long-focus shooting method in the foregoing embodiments.

In addition, embodiments of this application further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the long-focus shooting method in the foregoing method embodiment.

The electronic device, the computer storage medium, the computer program product, and the chip provided in embodiments are all configured to perform a corresponding method provided above. Therefore, for beneficial effects that can be achieved by the electronic device, the computer storage medium, the computer program product, and the chip, refer to beneficial effects of the corresponding method provided above. Details are not described herein again.

The foregoing descriptions about implementations allow a person skilled in the art to understand that, for the purpose of convenient and brief description, division into the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communications connections between the apparatuses or the units may be implemented in electronic, mechanical, or other forms.

The units described as separate parts may or may not be physically separate, and parts displayed as units may be one or more physical units, in other words, may be located at one place, or may be distributed on different places. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A long-focus shooting method, performed by an electronic device comprising a lens, wherein the long-focus shooting method comprises:
displaying a shooting interface of a camera of the electronic device, wherein the shooting interface comprises an image preview area, and wherein the image preview area displays a first preview stream;
receiving a first operation, wherein the first operation is used to adjust a first magnification of the first preview stream, and wherein the first operation is an adjustment operation of a user on a magnification in a magnification adjustment area; and
when the first magnification is greater than a first threshold, simultaneously displaying the image preview area and an auxiliary preview window on the shooting interface,
wherein the auxiliary preview window displays a second preview stream,
wherein the first preview stream is a preview stream at the first magnification,
wherein the second preview stream is a framed stream at a second magnification,
wherein the first preview stream is obtained by cropping the second preview stream,
wherein the first magnification is greater than or equal to the second magnification, and
wherein displaying the auxiliary preview window on the shooting interface in response to the first operation comprises when detecting that the first magnification is greater than or equal to the first threshold, automatically displaying, by the electronic device, the auxiliary preview window on the shooting interface.

2. The long-focus shooting method of claim 1, wherein the image preview area and the auxiliary preview window are displayed in any one of the following manners:
the auxiliary preview window overlaps the image preview area;
the auxiliary preview window is displayed at a right position of the image preview area; or
the auxiliary preview window is located in a lower left corner area of the image preview area.

3. The long-focus shooting method of claim 1, wherein the first operation is an operation of the user to activate the auxiliary preview window in a camera application.

4. The long-focus shooting method of claim 1, wherein the auxiliary preview window further comprises a close button, and wherein after displaying the auxiliary preview window on the shooting interface, the long-focus shooting method further comprises closing, by the electronic device, the auxiliary preview window if the electronic device detects an operation of the user on the close button.

5. The long-focus shooting method of claim 1, wherein the auxiliary preview window further comprises a target area, wherein a first image of the first preview stream is obtained by processing a second image in the target area, wherein the target area is a fixed area in the auxiliary preview window, or wherein the target area is any area in the auxiliary preview window.

6. The long-focus shooting method of claim 1, wherein the long-focus shooting method further comprises:
detecting a drag operation on the auxiliary preview window; and
moving the auxiliary preview window from a first position to a second position in response to the drag operation.

7. The long-focus shooting method of claim 1, further comprising displaying the magnification adjustment area on the shooting interface, wherein the first operation is an operation in which the user adjusts the first magnification by using the magnification adjustment area.

8. An electronic device, comprising:
a lens; and
one or more processors, a memory, a plurality of applications, and one or more programs, wherein the one or more programs are stored in the memory, and when the one or more programs are executed by the one or more processors, the electronic device is enabled to perform the following steps:
displaying a shooting interface of a camera, wherein the shooting interface comprises an image preview area, and wherein the image preview area displays a first preview stream;
receiving a first operation, wherein the first operation is used to adjust a first magnification of the first preview stream, wherein the first operation is an adjustment operation of a user on a magnification in a magnification adjustment area;
when the first magnification is greater than a first threshold, simultaneously displaying the image preview area and an auxiliary preview window on the shooting interface, wherein the auxiliary preview window displays a second preview stream, wherein the first preview stream is a preview stream at the first magnification, wherein the second preview stream is a framed stream at a second magnification, wherein the first preview stream is obtained by cropping the second preview stream, and wherein the first magnification is greater than or equal to the second magnification; and
when detecting that the first magnification is greater than or equal to the first threshold, automatically displaying the auxiliary preview window on the shooting interface.

9. The electronic device of claim 8, wherein the image preview area and the auxiliary preview window are displayed in any one of the following manners:
the auxiliary preview window overlaps the image preview area;
the auxiliary preview window is displayed at a right position of the image preview area; or
the auxiliary preview window is located in a lower left corner area of the image preview area.

10. The electronic device of claim 8, wherein the first operation is an operation of the user to activate the auxiliary preview window in a camera application.

11. The electronic device of claim 8, wherein the auxiliary preview window further comprises a close button, and when the one or more programs are executed by the one or more processors, the electronic device is enabled to perform the following step:
closing the auxiliary preview window if an operation of the user on the close button is detected.

12. The electronic device of claim 8, wherein the auxiliary preview window further comprises a target area, wherein a first image of the first preview stream is obtained by processing a second image in the target area, wherein the target area is a fixed area in the auxiliary preview window, or wherein the target area is any area in the auxiliary preview window.

13. The electronic device of claim 8, wherein when the one or more programs are executed by the one or more processors, the electronic device is enabled to perform the following steps:

detecting a drag operation on the auxiliary preview window; and moving the auxiliary preview window from a first position to a second position in response to the drag operation.

14. A non-transitory computer storage medium, comprising computer instructions, wherein when the computer instructions are run on an electronic device, the electronic device is configured to:

display a shooting interface of a camera of the electronic device, wherein the shooting interface comprises an image preview area, and wherein the image preview area displays a first preview stream;

receive a first operation, wherein the first operation is used to adjust a first magnification of the first preview stream, and wherein the first operation is an adjustment operation of a user on a magnification in a magnification adjustment area;

when the first magnification is greater than a first threshold, simultaneously display the image preview area and an auxiliary preview window on the shooting interface, wherein the auxiliary preview window displays a second preview stream, wherein the first preview stream is a preview stream at the first magnification, wherein the second preview stream is a framed stream at a second magnification, wherein the first preview stream is obtained by cropping the second preview stream, and wherein the first magnification is greater than or equal to the second magnification; and when detecting that the first magnification is greater than or equal to the first threshold, automatically display the auxiliary preview window on the shooting interface.

15. The non-transitory computer storage medium of claim 14, wherein the auxiliary preview window further comprises a close button, and wherein the electronic device is further configured to:

detect an operation performed by the user on the close button; and close, by the electronic device, the auxiliary preview window.

16. The non-transitory computer storage medium of claim 14, wherein the auxiliary preview window further comprises a target area, wherein a first image of the first preview stream is obtained by processing a second image of the target area, wherein the target area is a fixed area in the auxiliary preview window, or wherein the target area is any area in the auxiliary preview window.

17. The non-transitory computer storage medium of claim 14, further comprising:

detecting a drag operation on the auxiliary preview window; and moving the auxiliary preview window in response to the drag operation.

* * * * *